(12) United States Patent
Frank

(10) Patent No.: US 7,672,388 B2
(45) Date of Patent: Mar. 2, 2010

(54) METHOD OF PROVIDING SIGNAL DIVERSITY IN AN OFDM SYSTEM

(75) Inventor: Colin D. Frank, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 1014 days.

(21) Appl. No.: 11/387,372

(22) Filed: Mar. 23, 2006

(65) Prior Publication Data

US 2007/0223601 A1 Sep. 27, 2007

(51) Int. Cl.
*H04B 7/02* (2006.01)
(52) U.S. Cl. ...................................... 375/267
(58) Field of Classification Search ................ 375/260, 375/267, 299, 347
See application file for complete search history.

(56) References Cited

U.S. PATENT DOCUMENTS

2005/0265226 A1* 12/2005 Shen et al. .................. 370/210
2006/0034385 A1* 2/2006 Egashira et al. ............. 375/267
2006/0146692 A1* 7/2006 Gorokhov et al. ........... 370/208
2007/0098097 A1* 5/2007 Khan et al. ................. 375/260

* cited by examiner

*Primary Examiner*—Don N Vo
(74) *Attorney, Agent, or Firm*—Indira Saladi; Anthony P. Curtis

(57) ABSTRACT

A method and apparatus is provided for transceiving an information signal in an orthogonal frequency division multiplexed (OFDM) communication system that uses a plurality of radio frequency subcarriers modulated with the information signal and transceives the modulated plurality of radio frequency subcarriers through first and second antennas at a transmitter and first and second antennas at a receiver. The method includes the steps of providing first and second copies of the modulated plurality of radio frequency subcarriers that are transmitted from the transmitter to the receiver, phase rotating the first copy of the modulated plurality of radio frequency carriers with a subcarrier dependent phase rotation and summing the first rotated copy of the plurality of radio frequency subcarriers with the second copy of the modulated plurality of radio frequency carriers.

19 Claims, 2 Drawing Sheets

METHOD OF PROVIDING SIGNAL DIVERSITY IN AN OFDM SYSTEM

FIELD OF THE INVENTION

The field of the invention relates to radio frequency transmission systems and more particularly to OFDM systems.

BACKGROUND

Wireless Local Area Networks (WLANs) have become an important part of everyday life. Users (e.g., travelers, office workers, factory workers, etc.) can often gain access to communication systems (e.g., voice, e-mail, Internet, etc.) using a wireless device from any of a variety of locations (e.g., airport, office, factory, etc.).

Wireless devices used in conjunction with a WLAN typically operate under an appropriate IEEE standard (e.g., IEEE 802.11a) over a relatively short distance (e.g., 300 feet). In order to obtain continuous coverage, WLAN base stations must be placed at sufficiently short intervals as to provide overlapping service.

Even in the presence of overlapping WLANs, service may not be reliable for a number of reasons (e.g., Rayleigh fading). In order to overcome these difficulties, at least some WLAN devices rely upon the use of two or more antennas using a process called selection diversity. Under selection diversity, a controller within the WLAN device measures the signal from each of the antennas and selects the antenna providing the strongest signal.

Selection diversity is used, as opposed to more optimal antenna combining techniques, such as maximal ratio combining, because it has lower cost and less complexity. Selection diversity can be implemented with a single radio frequency front-end (e.g., using filtering and downconversion), a single complex analog-to-digital converter, and a single baseband demodulator that are shared, in a time-multiplexed fashion, between the two antennas. Conversely, maximal-ratio combining of the antennas and other similar techniques require a radio frequency front-end, a complex analog-to-digital converter, and a demodulator per antenna.

While selection diversity is effective for slow moving devices, it fails to provide reliable service where the user is moving (e.g., riding in an automobile), in that the best antenna (providing the strongest signal) can change from frame to frame, or even within the time span of a single frame. Accordingly, a need exists for a method of ameliorating the effects of movement that is compatible with the existing standards.

DETAILED DESCRIPTION

Described below is a method of transceiving an information signal in an orthogonal frequency division multiplexed (OFDM) communication system that uses a plurality of radio frequency subcarriers modulated with the information signal and transceives the modulated plurality of radio frequency subcarriers through first and second antennas at a transmitter and first and second antennas at a receiver. The method includes the steps of providing first and second copies of the modulated plurality of radio frequency subcarriers that are transmitted from the transmitter to the receiver of the orthogonal frequency division multiplexed communication system through the antennas, phase rotating the first copy of the modulated plurality of radio frequency carriers with a subcarrier dependent phase rotation and summing the first rotated copy of the plurality of radio frequency subcarriers with the second copy of the modulated plurality of radio frequency carriers. In general, a different phase rotation may be applied to each subcarrier of the first copy prior to its summation with the corresponding subcarrier of the second copy.

Figure 1:
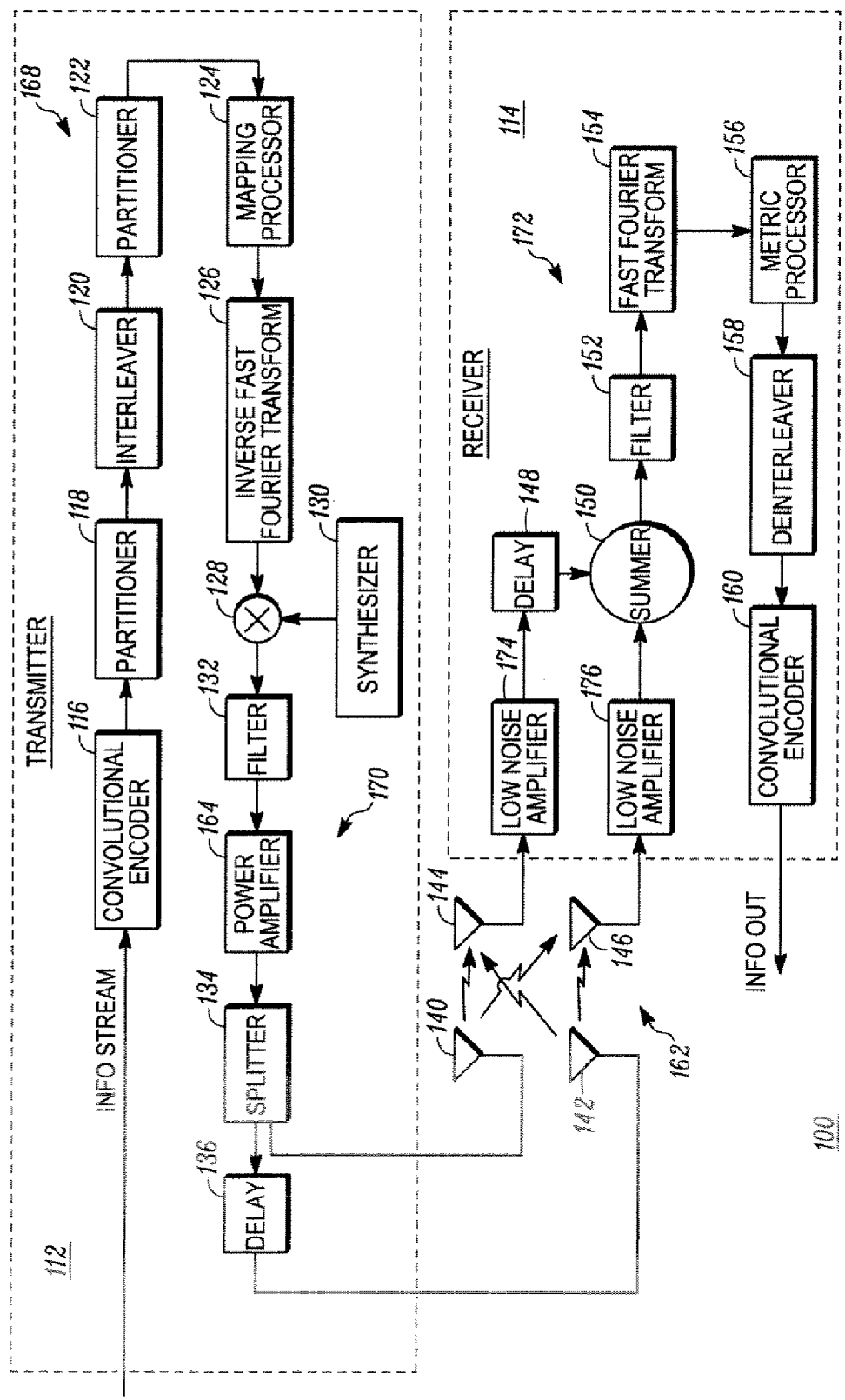
FIG. 1 depicts an OFDM communication system shown generally in accordance with an illustrated embodiment of the invention.

FIG. 1 is a block diagram of a radio frequency (rf) transceiving system 100 shown generally in accordance with an illustrated embodiment of the invention. The system 100 transceives signals under an OFDM format.

The system 100 may generally include a pair of transceivers 112, 114. For purposes of simplicity, only the transmitter of the first transceiver 112 (hereinafter "transmitter 112") and the receiver of the second transceiver 114 (hereinafter "receiver 114") are shown.

The system 100 may be used in any of a number of different contexts (e.g., a Motorola wireless local area network system). Within this context, either transceiver 112, 114 may be the client and, similarly, either may be the Access Point (AP), except as noted below. Alternatively, transceivers 112, 114 may both be APs in backhaul applications.

In one embodiment, the system 100 operates in accordance with the IEEE 802.11a standard with a theoretical maximum information data rate of 54 Mbps. In general, the system 100 may transceive signals using an appropriate center frequency (e.g., 4.9 Ghz) with a number of subchannels (e.g., 64). In the illustrated embodiment, 32 subchannels are located below the center frequency and 32 subchannels are located above the center frequency. Four subchannels are used for pilot symbols, while the outermost subchannels are left unmodulated in order to meet spectral limitations on out-of-band emissions. As a result, only 48 of the 64 subchannels are used for information transmission, with 24 of these subchannels lying above and below the center frequency.

In general, OFDM is a spread spectrum technique that distributes the data of the information signal over a large number of regularly spaced subcarriers. The subcarrier spacing is chosen relative to the symbol duration such that the subcarriers are orthogonal, and this prevents the subcarriers of the system 100 from interfering with each other. The benefits of OFDM are high spectral efficiency, its tolerance of channel multi-path (so long as delay spread of the propagation channel does not exceed the span of the cyclic prefix), and the fact that it can be modulated and demodulated using a Fast Fourier Transform (FFT). The tolerance of channel multipath is important because in a typical terrestrial broadcasting scenario there are usually a number of paths over which the transmitted signal can propagate to the receiver, with each path having a different length and thus a different corresponding delay. Since multiple versions of the signal interfere with each other in the receiver (causing inter symbol interference (ISI)), it becomes difficult to extract the intended information in non-OFDM systems, whereas the information can easily be extracted in an OFDM system (so long as the channel delay spread does not exceed the span of the cyclic prefix) by using an FFT demodulator.

Conventional IEEE 802.11a devices support selection transmit diversity. Selection transmit diversity is based upon first and second antenna used with both the transmitter 112 and receiver 114 and upon selection of the antenna that provides the best signal. Typically, antenna are either separated by a distance of 10λ (0.6 meters at 5 GHz) or orthogonally polarized.

However, selection transmit diversity is essentially useless under conditions where users are moving at vehicular speeds at an operating frequency of 5 GHz. For example, a transceiver 112, 114 traveling at 70 mph produces Doppler fading with a frequency of approximately 500 Hz and which causes the channel to decorrelate every 2 msec. Without an extremely high scanning rate for the antennas (which is not achievable since the frames are longer than the required scanning interval, and since it is not possible to scan or switch the antennas during a frame), the channel will decorrelate long before the next antenna scan is completed. As a result, the receiver is not able to ensure that the better of the two antennas is used for reception, and the benefit of selection diversity at the receiver is lost. In spite of this deficiency, antenna diversity of some type is a desirable feature of IEEE 802.11a on channels with Rayleigh fading, because the interleaver of the transceivers 112, 114 operates over only a single OFDM symbol, and thus provides no time diversity. As a result, in the absence of some type of antenna diversity, IEEE 802.11a will perform very poorly on channels with Rayleigh fading because Rayleigh fading provides no frequency diversity, and the IEEE 802.11a interleaver cannot exploit the time diversity of the channel. As a result, in the absence of some type of antenna diversity, the poor performance of IEEE 802.11a on Rayleigh fading channels will result in poor range and will necessitate the need for large fading margins to guarantee service coverage.

It has been found that with the introduction of delay among the transmit antennas and/or among the receive antennas, the order of diversity for an IEEE 802.11a signal transmitted over a Rayleigh fading channel can be increased from one to two. If implemented at the transmitter, the same signal is transmitted from multiple antennas, with the exception that a different delay is applied to each signal. If implemented at the receiver, a different delay is applied to the output of each receive antenna, after which the outputs are summed. It may be noted in this regard that because the IEEE 802.11a link has no time or frequency diversity on a one-path Rayleigh fading channel, the performance of the link is improved by several dB with the introduction of delay among the antennas. The delay among antenna can be introduced either at the transmitter or receiver (within either the client (mobile device) or the access point).

It may be noted that a delay among antenna at the transmitter 112 is less attractive than at the receiver 114 due to the power loss associated with the delay device. However, within the receiver 114, any power loss associated with the delay device can be easily compensated, making the implementation at the receiver 114 more attractive.

As described below, the delay may be used among the diversity antenna after the splitter on the transmit side, and before the combiner on the receive side. The required delay is small relative to the cyclic prefix (about 5%), so there is no significant degradation of the ability of the link to tolerate channel delay spread. In addition, this diversity method is transparent to the channel estimation algorithm used to otherwise support high speed motion and thus is entirely compatible with existing implementations of the IEEE 802.11a transmitter and receiver.

Turning next to the wireless link 162, a significant link margin (e.g., 9 dB) above a noise floor must be allocated to overcome Rayleigh fading in order to achieve 95% reliability. The reason for such a large link margin is that the IEEE 802.11a interleaver operates over only a single OFDM symbol, and, as a result the interleaver provides frequency diversity, but no time diversity. Since a one-path Rayleigh fading channel is not frequency-selective, there is no frequency diversity for the interleaver to exploit and thus a 9 dB link margin is required.

IEEE 802.11a devices such as the system 100 support two-antenna selection diversity, in which the AP selects the receive antenna with the greatest signal strength. With the assumption of channel reciprocity, the same antenna is used to transmit to the given client. In order to use selection diversity, the rate of change of the propagation channel must be slow relative to the interval between channel measurements for the two antennas. As a result, selection diversity is not well-suited for use in applications in which the IEEE 802.11a link must support users traveling at high speeds, since the antenna signal strength measurements are too infrequent to identify and track the best antenna.

Thus for IEEE 802.11a, there is a need for a transmit and receive diversity method that satisfies the following requirements: i) mitigates Rayleigh fading on both the forward and reverse links; ii) is compatible with the existing IEEE 802.11a standard, iii) is compatible with high-speed clients, iv) is compatible with existing baseband modem implementation of IEEE 802.11a and v) is low cost because, when implemented at the receiver, it does not require a second radio frequency front-end, a second complex analog-to-digital converter and a second demodulator.

As an example, consider what happens when the IEEE 802.11a signal is transmitted over two diversity antennas (either separated by 10λ or orthogonally polarized) and the propagation channel is a one-path Rayleigh fading channel. If one-half of the available transmitted power is sent over each of the two antennas and the two propagation channels are completely uncorrelated, the signal y at the receiver 114 may be expressed by the equation, $$y = \frac{1}{\sqrt{2}}\alpha x + \frac{1}{\sqrt{2}}\beta x + n = \frac{1}{\sqrt{2}}(\alpha + \beta)x + n = \gamma x + n,$$

where x is a transmitted signal and α and β are independent complex Gaussian random variables with zero mean and equal variance $\rho^2$. (The reader should note that the random variable γ also has zero mean and variance equal to $\sigma^2$, so that the transmit diversity in this form yields no benefit either with respect to the total received power, or the distribution of the received power).

Next consider a system 100 in which the signal is transmitted over a first antenna 140, but a different phase rotation φ(·) is applied to each of the 52 subchannels of the diversity transmission transmitted through the second antenna 142. Let the vector $x=(x_{-26},x_{-25}, \ldots x_{-1},x_1, \ldots ,x_{25},x_{26})$ denote the complex modulation applied to each subchannel of the OFDM signal, and let the vector $y=(y_{-26},y_{-25}, \ldots y_{-1},y_1, \ldots y_{25},y_{26})$ denote complex gain of each of the subchannels at the receiver 114. With the assumptions as above, and when the gains of the two propagation channels are uncorrelated complex Gaussian random variables α and β having zero mean and equal variance $\sigma^2$, the expression may be rewritten as follows, $$y = \frac{1}{\sqrt{2}}\alpha x + \frac{1}{\sqrt{2}}\beta \Phi x + n = w + n,$$

where

-continued $$w = (w_{-26}, w_{-25}, \ldots w_{-1}, w_1, \ldots, w_{25}, w_{26}),$$

where $$w_i = \frac{1}{\sqrt{2}}(\alpha + e^{j\phi(i)}\beta)x_i = \gamma_i X_i,$$

where $$\Phi = diag(e^{j\phi(-26)}, e^{j\phi(-25)}, \ldots, e^{j\phi(-1)}, e^{j\phi(1)}, \ldots, e^{j\phi(25)}, e^{j\phi(26)}),$$

and where n is a vector of independent zero mean complex Gaussian random variables of variance $\sigma^2$.

Note that the random variables $\gamma_i$, and $\gamma_j$ are independent so long as $mod(\phi(i)-\phi(j),2,\pi)=\pi$. As a result, with this example of transmit diversity, any two subchannels can be made to fade independently with respect to each other on a Rayleigh fading channel, and the effective order of the diversity is increased from one to two.

For a one-path Rayleigh fading channel, a diagonal matrix $\Phi$ can be chosen to minimize the packet error probability. In general, however, the optimal matrix $\Phi$ will depend on the modulation constellation, the coding rate, the interleaver, and the target packet error probability. For IEEE 802.11a, there are eight data rates, each of which corresponds to a different combination of modulation and coding. Note, however, that it is still possible to choose a single matrix $\Phi$ which improves the performance of all eight coding rates by at least 2 to 3 dB.

A similar method with multiple antennas at the receiver can be used to increase the effective order of diversity on Rayleigh fading channels. Let the vectors $y_1$ and $y_2$ denote, respectively, the FFTs of the signals received on the first and second antenna 144, 146. If the vector z is defined as the sum of $y_1$ multiplied by $1/\sqrt{2}$ and $y_2$ multiplied by $\Phi/\sqrt{2}$, it follows that the vector z is given by $$z = \left(\frac{1}{\sqrt{2}}\right)y_1 + \left(\frac{1}{\sqrt{2}}\Phi\right)y_2 = \left(\frac{1}{\sqrt{2}}\alpha x + \frac{1}{\sqrt{2}}n_1\right) + \left(\frac{1}{\sqrt{2}}\alpha\Phi x + \frac{1}{\sqrt{2}}n_2\right) = \frac{1}{\sqrt{2}}(\alpha + \beta\Phi)x + n = w + n.$$

As a result, the statistics of the vector z at the AP uplink receiver are precisely the same as those of the vectory at the client downlink receiver, and the order of diversity on both links has been increased from one to two.

In order to accommodate the situation in which the matrix $\Phi$ is allowed to be any diagonal matrix with unit energy elements along the diagonal, the system 100 may be modified in a number of ways. For example, an additional baseband processor may be required within the transmitter 112 to apply the phase rotation $\Phi$ to the data vector x, and perform two inverse FFIs for each OFDM symbol. A second analog-to-digital converter, a second transmit filter and a second power amplifier may also be required within the transmitter.

Within the receiver 114 a second receiver filter, a second low-noise amplifier, a second downconverter and a second analog-to-digital converter may be required. The baseband processor may be required to compute two FFTs, phase rotate one of these vectors using $\Phi$, and sum the first vector with the phase-rotated second vector.

Thus, while this diversity method is conceptually simple, the impact on the AP transceiver is significant. However, another simple method exists for implementing a phase rotation as suggested by the phase rotation element $\Delta$ shown in the equation as follows, $$\Phi = \Phi_\Delta = diag\left(e^{j\frac{-26\cdot 2\pi}{T}\Delta}, e^{j\frac{-25\cdot 2\pi}{T}\Delta}, \ldots, e^{j\frac{-2\pi}{T}\Delta}, e^{j\frac{2\pi}{T}\Delta}, \ldots, e^{j\frac{25\cdot 2\pi}{T}\Delta}, e^{j\frac{26\cdot 2\pi}{T}\Delta}\right).$$

The phase rotation element $\Delta$ may be implemented using only a simple phase delay device (e.g., a delay line) 136, 148 in the transmitter 112 and/or in the receiver 114 as shown in FIG. 1. While this method lacks the flexibility to implement an arbitrary phase rotation $\Phi$, the phase rotation $\Phi_\Delta$ is sufficient to provide most of the gain achievable with the more general phase rotation while adding only minimal complexity. Because the binary code symbols output by the convolutional encoder are interleaved across all subchannels, it should be sufficient that $$\frac{26\cdot 2\pi}{T}\Delta - \frac{-26\cdot 2\pi}{T}\Delta \geq \pi,$$

where T is the symbol duration and plus and minus 26 represents the frequency in radians per second of channel number 26 and −26. The expression may also be stated in equivalent form as $$\Delta \geq \frac{T}{104},$$

This equation establishes a minimum value for $\Delta$ and in some cases it may be advantageous to choose a value of $\Delta$ that is twice this large. Note that a delay of $\Delta=T/100$ is equal to only 5% of the duration of the cyclic prefix, which is 0.2 T, so that this method has a minimal impact on the ability of the receiver to tolerate delay spread. A delay of T/100, corresponds to 40, 80 and 160 nsec, respectively for the 20, 10 and 5 MHz implementations of IEEE 802.11a.

Note that due to the simplicity of this method of using a fixed time delay, it can be implemented in the AP (with two orthogonally polarized antennas), in the client, or both the AP and client. The method could easily be used to extend the range of an omni AP. It may be more difficult to use the method at the AP if directional antennas are used for coverage, since the number of antennas would be doubled. However, even in this case, range could be extended by using the method in the client.

Turning now to the drawing, FIG. 1 shows a transmitter 112 transmitting an information signal to a receiver 114. The transmitter 112 may include an encoding portion 168 and a transmitting portion 170. The encoding portion 168 may include a convolutional encoder 116, a first partitioner 118, an interleaver 120, a second partitioner 122, a mapping processor 124 and an IFFT processor 126. The transmitting portion 170 may include a mixer 128 and synthesizer 130, a filter 132, power amplifier 164, splitter 134, delay device 136, and antennas 140, 142.

As shown, an information stream (from an external source) may be encoded within the convolutional encoder 116. The encoded binary symbols may be partitioned within a first partitioner 118 into blocks of $2^{nbps}\times 48$ symbols which corresponds to the number of binary symbols mapped into an OFDM symbol. In this example, 48 subcarriers are used for transmission of the information signal and an additional four are used for pilot signals.

The term "nbps" is an integer that refers to the number of binary code symbols mapped into the QAM symbol for any given one of the 48 OFDM subchannels. In this regard nbps=1 for BPSK, nbps=2 for QPSK, nbps=4 for 16 QAM and nbps=6 for 64 QAM.

The $2^{nbps} \times 48$ symbols corresponding to a particular OFDM symbol are interleaved within the interleaver 120. The resulting interleaved sequence is again partitioned into 48 blocks of nbps binary symbols in the second partitioner 122. The partitioned blocks are assigned to each OFDM subchannels in sequence.

The nbps binary symbols assigned to each OFDM subchannel are then mapped into a QAM symbol within a mapping processor 124. Mapping in this case means retrieving a complex value based upon the nbps binary symbols of the respective OFDM subchannel.

An Inverse Fast Fourier Transform (IFFT) is performed on the OFDM subchannels within the IFFT 126.

The output of the IFFT 126 may be upconverted within a mixer 128 by mixing the previously spread signal with an output from a frequency synthesizer 130. In the example above, the synthesizer 130 may be operating at a frequency of 4.9 GHz.

The upconverted signal may then be filtered in a filter 132 to remove artifacts and applied to a splitter 134. The splitter 134 provides two substantially identical output copies of the input signal, each with one-half the power of the input.

A first output of the splitter 134 may be applied to a first antenna 140 of diversity antennas 140, 142. A second output of the splitter 134 may be applied to the delay device 136 where the modulated information signal is delayed by a predetermined value that may correspond to a given phase rotation between adjacent subcarriers.

The delay device 136 may be implemented simply as a fixed time phase delay device 136, as shown in FIG. 1. In this case, since a fixed time delay is used, the predetermined phase rotation on each of the subcarriers would be determined as a subcarrier dependent phase rotation by the frequency of the subcarrier. The resulting phase rotation in radians for a particular subcarrier would be determined by multiplying the time delay by the frequency of the subcarrier in radians per second. Once the signal has been phase delayed, the delayed signal may then be applied to the second antenna 142.

It should be noted that the modulated information signal is a series of OFDM symbols that each include a block of information elements of the information stream. Since the splitter 134 provides two outputs (albeit at one-half the power), the output of the splitter contains identical information elements of each partitioned block from the information stream. Since one output of the splitter 134 is delayed, the information elements transmitted by one antenna 142 over the wireless link 162 are delayed when compared to respective information elements transmitted over the link 162 through the second antenna 140.

Within the receiver 114, a pair of diversity antennas 144, 146 receives the signal. In the case of a phase rotation corresponding to a fixed time delay, the output of a first antenna 146 is applied directly from a low noise amplifier 176 to a summer 150 while the output of the second antenna 144 is amplified in a second low noise amplifier 174, delayed in a delay device 148 by a predetermined time delay and then summed with the output from the first antenna 146.

The sum of the modulated signal and delayed modulated signal are then filtered in a filter 152 and applied to a decoder section 172. Within the decoder 172, the filtered sum is transformed into the time domain within a Fast Fourier Transform (FFT) processor 154 where the OFDM symbol is recovered.

The output of the FFT processor 154 is applied to a metrics processor 156. Within the metrics processor 156, a set of metrics (information elements) are computed for each of the binary code symbols corresponding to the QAM symbol in each of the 48 OFDM data subchannels. For a M-QAM modulation type, $\log_2(M)$ metrics are computed for each data subchannel of each OFDM symbol.

The metrics from the metric processor 156 are provided as an input to a deinterleaver 158 which reorders the sequence of binary code symbol metrics to match the order of the corresponding binary code symbols. The reordered binary code symbol metrics are then provided as an input to a convolutional decoder where the original information stream is recovered.

As mentioned above, the delay may be introduced within the transmitter 112, the receiver 114 or both. Where introduced at both the transmitter 112 and receiver 114, the delay device 136 at the transmitter 112 would have a value of Δ and the delay device 148 at the receiver would have a value of 2 Δ. Equivalently, a value of 2 Δ could be used for the delay device 136 at the transmitter 112 with a value of Δ for the delay device 148 at the receiver. In both implementations, the end-to-end delays seen at the receiver would have values of 0, Δ, 2 Δ and 3 Δ, thereby introducing $4^{th}$ order time diversity into the received signal.

Figure 2:
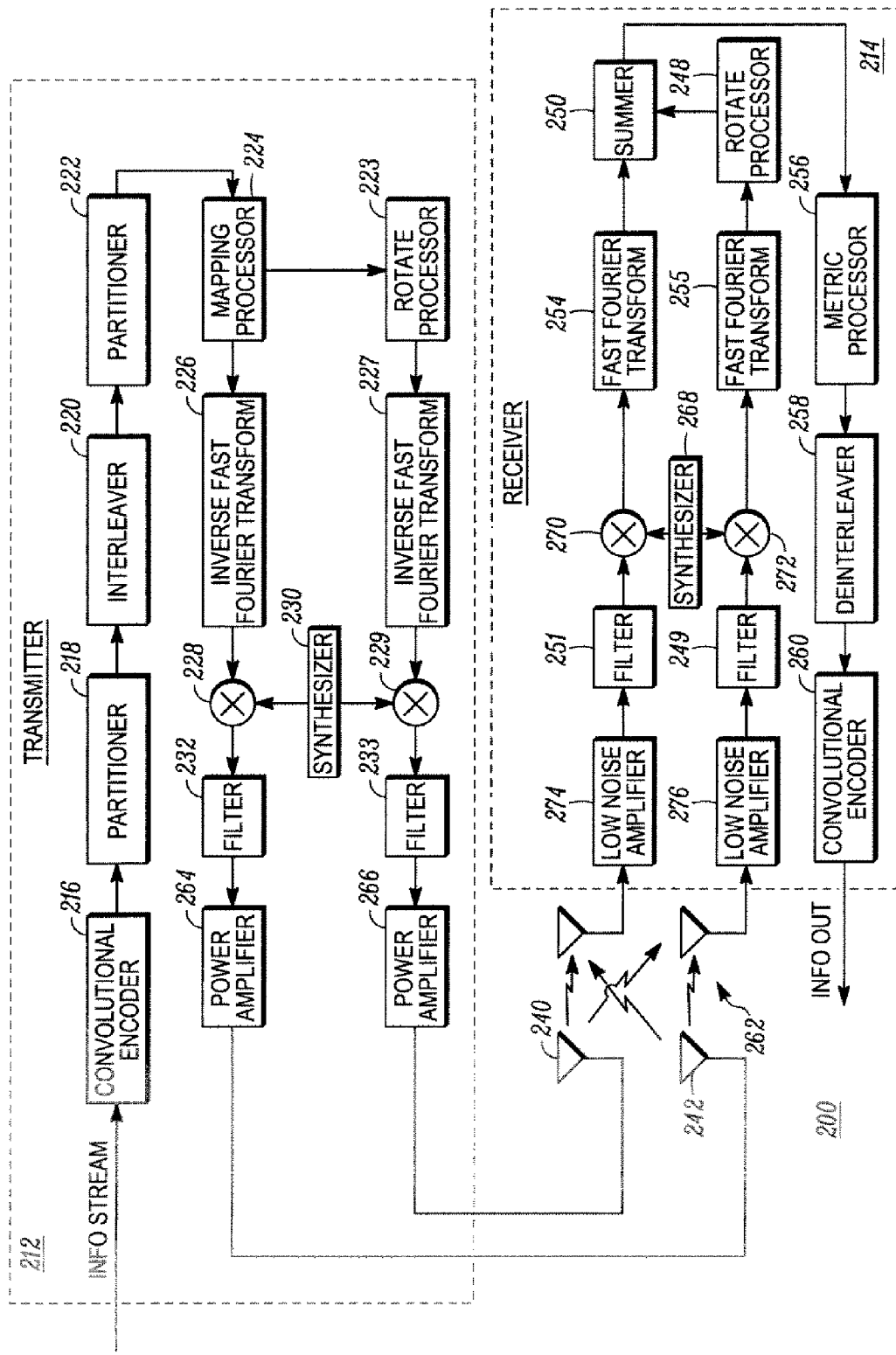
FIG. 2 depicts the OFDM communication system of FIG. 1 under an alternate embodiment.

While the introduction of time diversity may be implemented using the delay devices 136, 148 as shown in FIG. 1, it should be understood that time diversity may also be implemented at baseband just prior to the IFFT 227 in the transmitter and just after the FFT 255 in the receiver, as shown in FIG. 2. For example, where the delay is implemented as a matrix Φ, then a first and second signal paths may be used. The first and second signal path may be identical in the transmitter 212 except the use of a phase rotate processor 223. Within the phase rotate processor 223, a subcarrier dependent phase rotation Φ may be applied to the data vector x to produce a predetermined phase rotation on each of the subcarriers.

The convolutional encoder 216, partitioner 218, interleaver 220, partitioner 222 and FFT 227 may operate as described above with reference to FIG. 1. One difference, however, is that the mapper 224 may provide identical outputs (identical copies). One output may be applied to a first IFFT processor 226, while the second output becomes an input to the rotate processor 223 where the subcarrier dependent phase rotation is applied to the second signal stream.

The data for each OFDM symbol of the first signal stream is modulated within the IFFT 226, upconverted in mixer 228, filtered within filter 232, amplified with an amplifier 264 and transmitted through the antenna 240. The data for each phase rotated OFDM symbol of the second signal stream may be modulated within the IFFT 227, upconverted in mixer 229, filtered within filter 233, amplified with an amplifier 266 and transmitted through the antenna 242.

Within the receiver 214, a similar set of parallel paths are used. In a first signal path, a first signal is amplified within a LNA 274, filtered in a filter 251 and downconverted within a mixer 270 by mixing the filtered signal with a downconversion signal from a synthesizer 268. Symbols of the first signal may be recovered in a first FFT 254, the output of which is provided to a vector summer 250.

In a second signal path, a second signal is amplified within a LNA 276, filtered in a filter 249 and downconverted in a second mixer 272. Symbols of the second signal may be recovered in a second FFT 255. The recovered symbols of the second signal stream are then rotated using diagonal matrix $\Phi$ in a rotate processor 248, the output of which is provided to the vector summer 250.

The output of the vector summer 250 is provided to the metrics processor 256 which computes the metrics for each OFDM symbol. The metrics are deinterleaved 258 and convolutionally decoded 260 as described above.

A specific embodiment of method and apparatus for providing frequency diversity in an ODFM transceiver have been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of transceiving an information signal in an orthogonal frequency division multiplexed communication system that uses a plurality of radio frequency subcarriers modulated with the information signal and transceives the modulated plurality of radio frequency subcarriers through first and second antennas at a transmitter and first and second antennas at a receiver, such method comprising:
   providing first and second copies of the modulated plurality of radio frequency subcarriers that are transmitted from the transmitter to the receiver of the orthogonal frequency division multiplexed communication system through the first and second antennas;
   phase rotating the first copy of the modulated plurality of radio frequency carriers with a subcarrier dependent phase rotation; and
   summing the rotated first copy of the plurality of radio frequency subcarriers with the second copy of the modulated plurality of radio frequency carriers.

2. The method of transceiving an information signal as in claim 1 further comprising phase rotating the first copy in the transmitter.

3. The method of transceiving an information signal as in claim 1 further comprising phase rotating the first copy in the transmitter at a baseband frequency.

4. The method of transceiving an information signal as in claim 3 further comprising phase rotating the first copy in the transmitter using a diagonal matrix $\Phi$.

5. The method of transceiving an information signal as in claim 1 further comprising phase rotating the first copy in the transmitter at a transmission frequency.

6. The method of transceiving an information signal as in claim 5 further comprising splitting the modulated plurality of radio frequency subcarriers into substantially identical copies at the transmission frequency and delaying the first copy with a fixed time delay.

7. The method of transceiving an information signal as in claim 1 further comprising phase rotating the first copy in the receiver at a transmission frequency using a fixed time delay.

8. The method of transceiving an information signal as in claim 1 further comprising phase rotating the first copy within the receiver at a baseband frequency.

9. The method of transceiving an information signal as in claim 8 further comprising phase rotating the first copy using a diagonal matrix $\Phi$.

10. The method of transceiving an information signal as in claim 1 further comprising phase rotating the first copy in the transmitter and receiver.

11. A receiver within an orthogonal frequency division multiplexed communication system that receives a plurality of radio frequency carriers modulated with an information signal comprising:
    a first antenna that receives the plurality of radio frequency carriers;
    a second antenna that receives the plurality of radio frequency carriers;
    a rotate processor that produces subcarrier dependent phase rotation of the modulated plurality of radio frequency carriers received through the second antenna; and
    a summer within the receiver that sums the modulated plurality of radio frequency carriers from the first antenna with the phase rotated, modulated plurality of radio frequency carriers from the second antenna.

12. The receiver as in claim 11 wherein the subcarrier dependent phase rotation further comprises a fixed time delay used at a transmission frequency.

13. The receiver as in claim 11 wherein the rotate processor further operates at a baseband frequency.

14. The receiver as in claim 13 wherein the rotate processor further comprises a diagonal matrix $\Phi$.

15. The receiver as in claim 11 wherein the phase rotation further comprises delays of 0, $\Delta$, 2$\Delta$ and 3$\Delta$.

16. A transmitter for transmitting an information signal in an orthogonal frequency division multiplexed communication system using a plurality of radio frequency carriers and first and second antenna, the transmitter comprising:
    a plurality of radio frequency carriers modulated with the information signal;
    a first antenna for transmitting the plurality of radio frequency carriers;
    a splitter operating at a transmission frequency that splits the modulated plurality of radio frequency carriers into two substantially identical copies each at one-half a power level of an input and that couples a first copy of the substantially identical copies to the first antenna;
    a rotate processor that phase rotates the modulated plurality of radio frequency carriers with a subcarrier dependent phase rotation; and
    a second antenna for transmitting the rotated plurality of radio frequency carriers.

17. The transmitter as in claim 16 wherein the phase rotator further comprises a phase delay device that imposes a predetermined frequency dependent phase delay on each of the plurality of modulated carriers transmitted through the second antenna.

18. The transmitter as in claim 17 wherein the phase rotator further comprises a rotation processor operating at a baseband frequency.

19. The transmitter as in claim 17 wherein the rotation processor further comprises a diagonal matrix $\Phi$.

* * * * *

UNITED STATES PATENT AND TRADEMARK OFFICE
CERTIFICATE OF CORRECTION

| | | |
|---|---|---|
| PATENT NO. | : 7,672,388 B2 | |
| APPLICATION NO. | : 11/387372 | |
| DATED | : March 2, 2010 | |
| INVENTOR(S) | : Frank | |

It is certified that error appears in the above-identified patent and that said Letters Patent is hereby corrected as shown below:

1. In Column 5, Line 17, delete "2,π)" and insert -- 2π) --, therefor.

2. In Column 5, Line 47, delete "vectory" and insert -- vector y --, therefor.

3. In Column 5, Line 57, delete "FFIs" and insert -- FFTs --, therefor.

Signed and Sealed this
Eleventh Day of October, 2011

David J. Kappos
*Director of the United States Patent and Trademark Office*